US010069431B2

(12) United States Patent
Leedham et al.

(10) Patent No.: US 10,069,431 B2
(45) Date of Patent: Sep. 4, 2018

(54) LOW-SKEW COMMUNICATION SYSTEM

(71) Applicant: Maschinenfabrik Reinhausen GmbH, Regensburg (DE)

(72) Inventors: Robert John Leedham, Cambridge (GB); Matteo Vit, Cambridge (GB); Stephen Parker, Cambridge (GB); Ivan Cronin, Cambridge (GB)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 178 days.

(21) Appl. No.: 14/894,538

(22) PCT Filed: Jun. 17, 2014

(86) PCT No.: PCT/GB2014/051849
§ 371 (c)(1),
(2) Date: Nov. 30, 2015

(87) PCT Pub. No.: WO2014/207436
PCT Pub. Date: Dec. 31, 2014

(65) Prior Publication Data
US 2016/0197560 A1    Jul. 7, 2016

(30) Foreign Application Priority Data
Jun. 25, 2013    (GB) .................................. 1311248.7

(51) Int. Cl.
*H04L 25/493*    (2006.01)
*H02M 7/00*    (2006.01)
(Continued)

(52) U.S. Cl.
CPC .............. *H02M 7/00* (2013.01); *G05B 15/02* (2013.01); *G06F 13/4295* (2013.01);
(Continued)

(58) Field of Classification Search
CPC   H02M 7/00; H02M 2001/0012; G05B 15/02; G06F 13/4295; H04L 12/40014; H04L 12/04; H04L 25/493
See application file for complete search history.

(56) References Cited

U.S. PATENT DOCUMENTS 5,692,127 A    11/1997 Devon
6,516,364 B1    2/2003 Koblin
(Continued)

FOREIGN PATENT DOCUMENTS

DE    19515384 A    11/1996
DE    19705681 A    8/1998
JP    2012257153 A    12/2012

*Primary Examiner* — Kent Krueger
(74) *Attorney, Agent, or Firm* — Andrew Wilford

(57) ABSTRACT

The invention generally relates to power converters, and more particularly to a communications method for controlling at least one power switching device of a power converter, a communications system for a power converter, and a power converter comprising the communications system. For example there is provided a communications method for controlling at least one power switching device of a power converter, the method comprising: inputting a signal to a transmit end of a communications link; inputting data to the transmit end of the communications link; determining whether the signal comprises a transition; when said determination indicates that the signal comprises a transition, transmitting the signal comprising the transition into a communications channel of the communications link, wherein the transmitted signal is delayed by a predetermined time delay relative to the inputted signal, said predetermined time delay to allow said determining; transmitting the data on the communications channel, wherein when said determination indicates that the signal comprises a transition the transmitting the data is delayed until after said transmitting the signal; and if the signal has been transmitted, receiving (Continued)

the transmitted signal at the receive end of the communications link and controlling at least one said power switching device dependent on said received signal.

21 Claims, 13 Drawing Sheets

(51) Int. Cl.
*H04L 12/40* (2006.01)
*G06F 13/42* (2006.01)
*G05B 15/02* (2006.01)
*H02M 1/00* (2006.01)

(52) U.S. Cl.
CPC ............... *H04L 12/40013* (2013.01); *H02M 2001/0012* (2013.01); *H04L 25/493* (2013.01); *Y02D 10/14* (2018.01); *Y02D 10/151* (2018.01)

(56) References Cited

U.S. PATENT DOCUMENTS

| | | | |
|---|---|---|---|
| 2002/0018443 A1* | 2/2002 | Vleesschauwer | H04L 1/0007 370/229 |
| 2004/0151269 A1* | 8/2004 | Balakrishnan | H04B 1/71637 375/355 |
| 2005/0057319 A1 | 3/2005 | Maunuksela | |
| 2009/0013116 A1 | 1/2009 | Svanell | |
| 2011/0095740 A1 | 4/2011 | Mori | |
| 2012/0013372 A1* | 1/2012 | Campbell | H03K 5/135 327/141 |
| 2012/0243264 A1 | 2/2012 | Nakagawa | |

* cited by examiner

LOW-SKEW COMMUNICATION SYSTEM

FIELD OF THE INVENTION

The present invention generally relates to power converters, and more particularly to a communications method for controlling at least one power switching device of a power converter, a communications system for a power converter, and a power converter comprising the communications system.

BACKGROUND TO THE INVENTION

A communications system may be used to connect together components of a power converter, such as an AC to DC converter or a DC to AC inverter. The converter may be for applications ranging from low voltage chips, to computers, locomotives and high voltage transmission lines. More specific example applications are for switching in high voltage dc transmission lines of the type which may, for example, carry power from an offshore wind installation, and medium voltage (for example greater than 1 KV) switching for motors and the like, for example locomotive motors.

The components of the converter connected by the communications system might be controllers such as intelligent devices which determine the required state of a collection of power switching devices, switching units such as intelligent "gate drives" which control the state of an individual power-switching device such as an insulated gate bipolar transistor (IGBT), sensors such as temperature or current sensor, or actuators such as a cooling system pump. Examples of such power switching devices include IGBTs as mentioned above, alternatively however may be FETs such as MOS-FETS (vertical or lateral) and JFETs, or potentially devices such as LILETs (lateral inversion layer emitter transistors), SCRs and the like. The techniques we will describe are however not limited to any particular type of general converter architecture or any particular type of power switching device.

Considering specifically communication between a controlling device (CD) and one or more power switching units (SU) of a power electronics system, there is generally a control channel conveying switching information, and a data channel conveying configuration information. In power electronics, voltage isolation is generally required between a CD and SU. Thus, physical communications links may be provided either by optical means (opto-couplers or fibre transceivers), electrical means (inductive or capacitive coupling) or RF means.

For example, a power-electronics systems may comprise a point-t)-point fibre-optic pair between a controller and a switching unit—referred to as a legacy fibre-optic network (LFON). In this scheme one fibre carries control data from the controller to the switching device where "light on" means "turn on"; the other fibre carries fault data from the switching device to the controller where "light off" means "fault". Any further information has to be transmitted by an alternate communication channel, e.g., such that the control/fault and data streams are carried on physically separate channels (wires). However, the cost of any additional physical link is high, both in terms of board area and component cost.

Therefore, there remains a need for an improved communications method or system, preferably having advantages such as, inter alia, reliable switching operation of each power switching device, high efficiency and/or low power dissipation of the power converter (for example reducing power consumption associated with switching of power switching devices), known latency, low skew, reduced cost of manufacturing, reduced size, and/or backwards compatibility with existing system components (e.g., components designed for LFON), etc.

SUMMARY

According to a first aspect of the present invention, there is provided a communications method for controlling at least one power switching device of a power converter, the method comprising: inputting a signal to a transmit end of a communications link; inputting data to the transmit end of the communications link; determining whether the signal comprises a transition; when said determination indicates that the signal comprises a transition, transmitting the signal comprising the transition into a communications channel of the communications link, wherein the transmitted signal is delayed by a predetermined time delay relative to the inputted signal, said predetermined time delay to allow said determining; transmitting the data on the communications channel, wherein when said determination indicates that the signal comprises a transition the transmitting the data is delayed until after said transmitting the signal; and if the signal has been transmitted, receiving the transmitted signal at the receive end of the communications link and controlling at least one said power switching device dependent on said received signal.

Thus, an embodiment may allow transmission of data (for example for setting or confirming configuration settings) and of a control or fault signal over a single physical communications link (e.g., fibre-optic or electrical), advantageously using a single communications channel (logical connection), while ensuring that transmission of the signal is prioritised over the data when appropriate so that a transition of the signal is always delivered with known and/or low latency. Such low latency is particularly advantageous where a substantially real-time requirement exists, e.g., for fault indication. The latency may be determined by the predetermined time delay, which is preferably implemented using a buffer, e.g., serial buffer, for the signal to pass through prior to transmission. The delay in sending the data may effectively prevent collision of data and signals on the communications channel, this being of particular advantage where such data and signals may be generated asynchronously before inputting to the transmit end. Furthermore, the transfer of control/fault and data streams over one physical channel in each direction may be advantageous for backwards compatibility with existing solutions. Further still, by reducing the number of channels (wherein a channel may in embodiments be described as a logical connection) in this way, material usage and/or costs, e.g., board area and component cost, may be reduced.

The embodiment may allow communication of a signal transition, e.g., a state change such as high-low or digital '1'->'0' (or vice versa), to be effectively prioritised to propagate on the communications link ahead of a less time-critical data message. Such a transition as part of a control signal may be used to trigger switching of a power switching device at the receive end of the communications link, preferably via a driver such as a gate drive for an IGBT module. Where such switching is triggered, the dependent control may be considered as being directly responsive to the control signal. Alternatively, where such a transition as part of a fault signal, the dependent control may control a power switching device(s) at the receive end of the aforementioned link and/or other power switching devices within the converter, for example such devices coupled in series and/or parallel in one or more phase legs of a converter (see, e.g., FIG. 9(a)). Thus, the current conducted by such devices within such a network may be redistributed among the devices in the event of a fault at any one device.

As indicated above, in any embodiment, any control of a power switching device is preferably performed by means of a drive circuit, e.g., gate drive for an IGBT hence a power switching device in any embodiment may be coupled to a communications link via a drive circuit, which receives control signals and controls the device to switch accordingly and/or sends fault signals relating to the drive circuit and/or power switching device(s) via the communication link to the controller. The transmit and/or receive ends of the communications link may comprise an interface, for example to the drive circuit and/or power switching device, or to the controller.

There may further be provided the communications method, wherein the communications link is a first communications link, the signal is a first signal, the data is first data and the predetermined time delay is a first predetermined time delay, the method further comprising conveying a second signal and second data via a second communications link, wherein the conveying via the second link comprises: inputting the second signal to a transmit end of the second communications link; inputting the second data to the transmit end of the communications link; determining whether the second signal comprises a transition; when said determination indicates that the second signal comprises a transition, transmitting the second signal into a communications channel of the second communications link, wherein the transmitted second signal is delayed by a second predetermined time delay relative to the inputted second signal, said second predetermined time delay to allow said determining whether the second signal comprises a transition; transmitting the second data on the second communications channel wherein, when said determination indicates that the second signal comprises a transition, the transmitting the second data is delayed until after said transmitting the second signal; and if the second signal has been transmitted, receiving the transmitted signal at the receive end of the communications channel, and controlling at least one further power switching device dependent on said received second signal.

Thus, an embodiment may provide data transmission while ensuring low skew between arrival of transitions of signals such as control or fault signals at respective destinations, even though a single physical communications link/channel may be used for signal and data destination to each destination. This is of particular interest where the signals are control signals for switching power switching devices such as IGBTs on and off. For example, low skew may be advantageous regarding voltage balancing of serially connected IGBTs or for current sharing in parallel connected IGBTs in a power converter (see FIG. 9(a)), such balancing affecting inter alia reliability and/or power consumption.

In view of the above, to synchronise the switching of multiple power switching devices, an embodiment may allow a control channel to each of a plurality of switching units to have known latency and further allow low skew between such units. Similar advantages may be found in relation to communications from a switching device or unit to a controller, wherein such communications are for conveying status information and monitoring information.

Preferably, the first and second predetermined time delays are for substantially (e.g., exactly or approximately) synchronising controlling of the at least one power switching device dependent on the received first signal and controlling of the at least one further power switching device dependent on the received second signal when the first and second signals are transmitted simultaneously. Where each said controlling comprises switching the at least one power switching device on or off, the time delays may thus improve, e.g., reliability and/or power efficiency and/or reduce stress on one or more switching devices at the point of switching.

In order to provide a known timing delay which is consistent from channel to channel, the first and second predetermined time delays may be substantially equal, to thereby reduce skew between arrival of the first signal at the receive end of the first communications link and arrival of the second signal at the receive end of the second communications link.

There may further be provided the communications method, wherein the data is sent on the communications channel using a modulation scheme, the method comprising processing, e.g., decoding, a pulse received at a receive end of the communications link as a control or fault signal pulse if the received pulse has duration greater than a predetermined pulse width of the data modulation scheme. Such data may be the first or second data described above. Preferably, the pulse is treated a control/fault pulse if its length is greater than a threshold length, e.g., greater than expected duration of a data pulse of the modulation scheme, e.g., twice the duration of a data pulse. This may allow for some pulse width distortion due for example to propagation conditions. Distinguishing on the basis of pulse width may be considered an example of distinguishing between a control/fault signal and a data signal on the basis of frequency, in this case on the basis of the lower pulse frequency of the control/fault signal compared to the data signal.

The first (second) delayed data may transmitted onto the communications channel at a predetermined delay after said transmitting said first (second) signal on the communications channel. In this case, the data may not be sent immediately after the control signal has been sent. Rather, a fixed delay for the data transmission may allow known and/or low latency in data transmission, in addition to the improved latency of a control/fault signal as described above. The data and signal may be the first data and signal or the second data and signal. We note however that in embodiments the predetermined delay may not always occur, e.g., where the signal has a high frequency and takes precedence such that the data could be delayed indefinitely rather than having a the predetermined delay and/or if there is a clash in the buffer—if the signal has another transition shortly after a first transition than the data may be delayed again.

Preferably, any data which could comprise fault or control information is transmitted on the communications channel using pulse position modulation (PPM), preferably differential PPM (DPPM). Null symbols may be inserted into the first and/or second data to provide the delay in transmitting the data on the communications channel.

There may further be provided the communications method, wherein the transmissions of the signal and data on the communications channel are to a module comprising the at least one said power switching device and the signal is control signal, wherein the controlling dependent on the received signal controls switching of the at least one said power switching device of the module.

There may further be provided the communications method, wherein the transmissions of the signal and data on the communications channel are from a module comprising at least one said power switching device and the signal is a fault signal, wherein the controlling dependent on the received signal controls switching of at least one said power switching device of the power converter, e.g., such an indication that has a real-time requirement. The controlling dependent on the received signal preferably then controls switching of at least one said power switching device of the power converter, e.g., turns off the power switching device associated with the fault indication, and/or turns off other power switching devices possibly of other modules on or off to a general shut down of the power converter or to at least redistribute the current that would have been conducted by the faulty module.

Similarly, there may further be provided the communications method, wherein the transmissions of the signal and data are from a module comprising at least one said power switching device, the signal comprises a condition indication of the module, the method comprising monitoring for a said condition in substantially real time, the method preferably comprising substantially real-time control based on said condition indication. Such a condition indication may comprise status and/or monitoring information, e.g., a sensor measurement. Preferably the condition indication may serve a real-time monitoring requirement. The indicated condition may relate to any parameter of the module, e.g., of a power switching device and/or drive circuit of the module. The condition may be a state, sensor output, and/or measured characteristic such as voltage, current, temperature, humidity, etc. .

In either of the above cases involving conveying signal and data from a module, the data may merely comprise an acknowledgement of a signal (e.g., fault signal, or control signal for triggering switching a power switching device, and/or a signal to acknowledge receipt of the data) received from the controller.

There may further be provided the communications method, wherein the transmissions of the signal and data are to a module comprising at least one said power switching device, the data indicating a setting to be implemented in the module and/or at least one request for a condition indication of the module and/or at least one acknowledgement of a signal (e.g., control or fault signal) received from the module.

There may further be provided the communications method, wherein the transmissions of the signal and data are from a module comprising at least one said power switching device, the data indicating current module settings and/or at least one condition indication of the module and/or at least one acknowledgement of a signal received at the module.

There may yet further be provided the communications method, comprising: sending a clock signal on a further channel of a said communications link; and using said clock signal to synchronise logic circuit operation at the transmit end and the receive end of the communications link, said logic circuit operation for processing a said received signal and/or received data. An advantage of this is to reduce timing uncertainty. One clock domain means that the signal and data do not need to be re-synchronised to a separate clock. If there is only one clock domain, then signals and data to not need to cross timing boundaries, which generally introduces uncertainty (skew and/or jitter) as the signals are retimed.

To reduce jitter on the control signal, the method may comprise: recovering a clock signal from the signal and/or data received at the receive end; and synchronising logic circuit operation at the transmit end and the receive end of the communications channel on the basis of the recovered clock signal, said logic circuit operation for processing the received signal and/or data. Such recovery may be achieved using a phase locked loop.

According to a second aspect of the present invention, there is provided a communications system for a power converter having at least one module comprising at least one power switching device and further having at least one controller to control at least one said module, the system comprising: a transmitter configured to receive a signal and data, the transmitter for transmitting the received signal and data over a communications channel for coupling a said controller to at least one said module, the transmitter comprising: a signal buffer configured to store the received signal; a data buffer configured to store the received data; and a detector configured to determine whether the stored signal comprises a transition, wherein the transmitter is configured to delay transmission of the stored signal on the communications channel by a predetermined time delay determined by said signal buffer, the predetermined time delay for said determining; and wherein the data buffer is configured to, when said detector indicates that the stored signal comprises a transition, delay transmitting said stored data on the communications channel until after said transmission of the stored signal on the communications channel.

In such an embodiment, the signal buffer preferably delays transmission of the received control signal from the transmitter, and the data buffer similarly may delay transmission of the received data from the transmitter. The time delay implemented by each buffer may realise a low and/or known latency for the buffered datalsignal to be transmitted over the communications link. Either or both delays may be determined, e.g., by using the length of a serial buffer and/or using a timer for controlling timing of output from a buffer.

There may further be provided the communications system, wherein the signal is a first signal and the predetermined time delay is a first predetermined time delay, the system configured to store and transmit a further said signal and further said data on a further said communications channel coupled to a further said module, the system comprising a detector to determine whether the further signal comprises a transition, the system configured to delay transmission of the stored further signal on the further communications channel by a second predetermined time delay determined by a signal buffer for said storing the further signal, the second predetermined time delay for said determining whether the second signal comprises a transition, wherein the first and second predetermined time delays have values to reduce skew between arrival of the first and second signals at respective communications channel receive ends.

There may further be provided the communications system, wherein the first and second predetermined time delays have values to substantially synchronise said controlling of the at least one power switching device dependent on the received first signal and said controlling of the at least one further power switching device dependent on the received further signal.

There may still further be provided the communications system, comprising a receiver for receiving a said transmitted signal and data from the transmitter via a said communications channel, wherein the transmitter is configured to transmit the data on the communications channel using a modulation scheme, the receiver comprising: a detector configured to determine whether a received pulse has duration greater than a predetermined pulse width, wherein said predetermined pulse width is a pulse width of the data modulation scheme; a decoder configured to decode a pulse received at a receive end of the communications channel as a control signal pulse if an output of the detector indicates that the received pulse has duration greater than said predetermined pulse width.

There may further be provided a power converter comprising the communications system, the converter having at least one module comprising at least one said power switching device and a drive circuit to control switching of the at least one power switching device, the converter having at least one said controller to output a said signal for controlling the at least one said power switching device, the converter comprising at least one said communications link for at least one said communications channel.

There may yet further be provided the power converter or communications system, wherein at least one said power switching device comprises an IGBT.

Preferred embodiments are defined in the appended dependent claims.

Any one or more of the above aspects and/or any one or more of the above optional features of the preferred embodiments may be combined, in any permutation.

BRIEF DESCRIPTION OF THE DRAWINGS

For a better understanding of the invention and to show how the same may be carried into effect, reference will now be made, by way of example, to the accompanying drawings, in which:

FIG. 6(a) shows data_in=0, control_in transitions from 0 to 1 and appears at control_out after 852 ns; FIG. 6(b) is a zoom of FIG. 6(a) showing the relationship between the pulses and the transmit and receive clocks (clk_tx and clk_rx). FIG. 6(c) shows data_in=1, control_in transitions from 1 to 0 and appears at control_out after 850 ns. FIG. 6(d) is zoom of FIG. 6(c);

DETAILED DESCRIPTION OF PREFERRED EMBODIMENTS

Figure 9A:
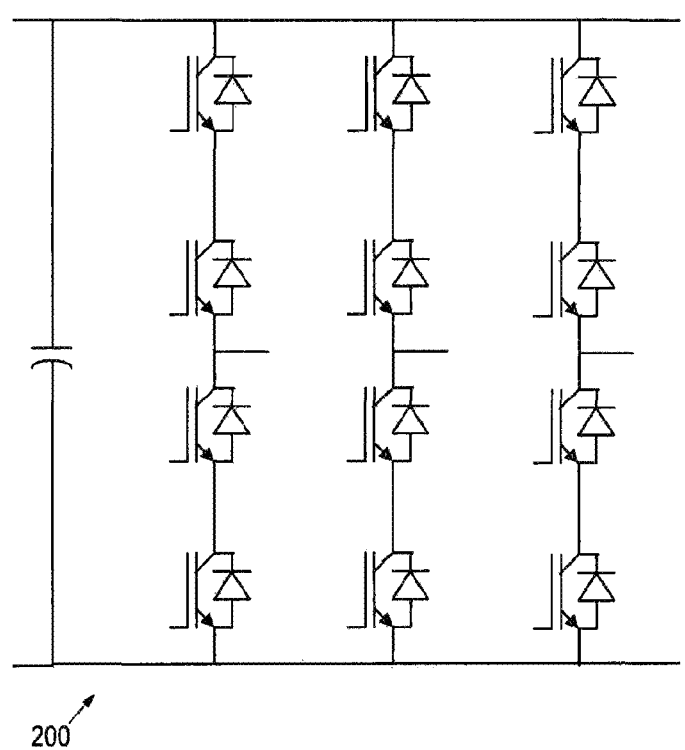
FIGS. 9(a) and 9(b) show a network of switching devices (represented merely for example as IGBTs) as may be found in a converter embodiment, e.g., a multiple phase leg inverter.

An embodiment provides a communication method applicable to a power converter such as an AC to DC converter or a DC to AC inverter. Merely for example, FIG. 9 shows a multiple phase leg inverter having two IGBTs stacked in each of the upper and lower sides of each phase leg. A single- or multiple phase leg inverter may be provided as the power switching apparatus 4 of FIG. 10(a) comprising on the device side one or more phase legs having IGBTs coupled to be controlled by gate drivers 2. The device drivers are each coupled to be controlled by a gate driver controller 1 on the control side.

Figure 10A:
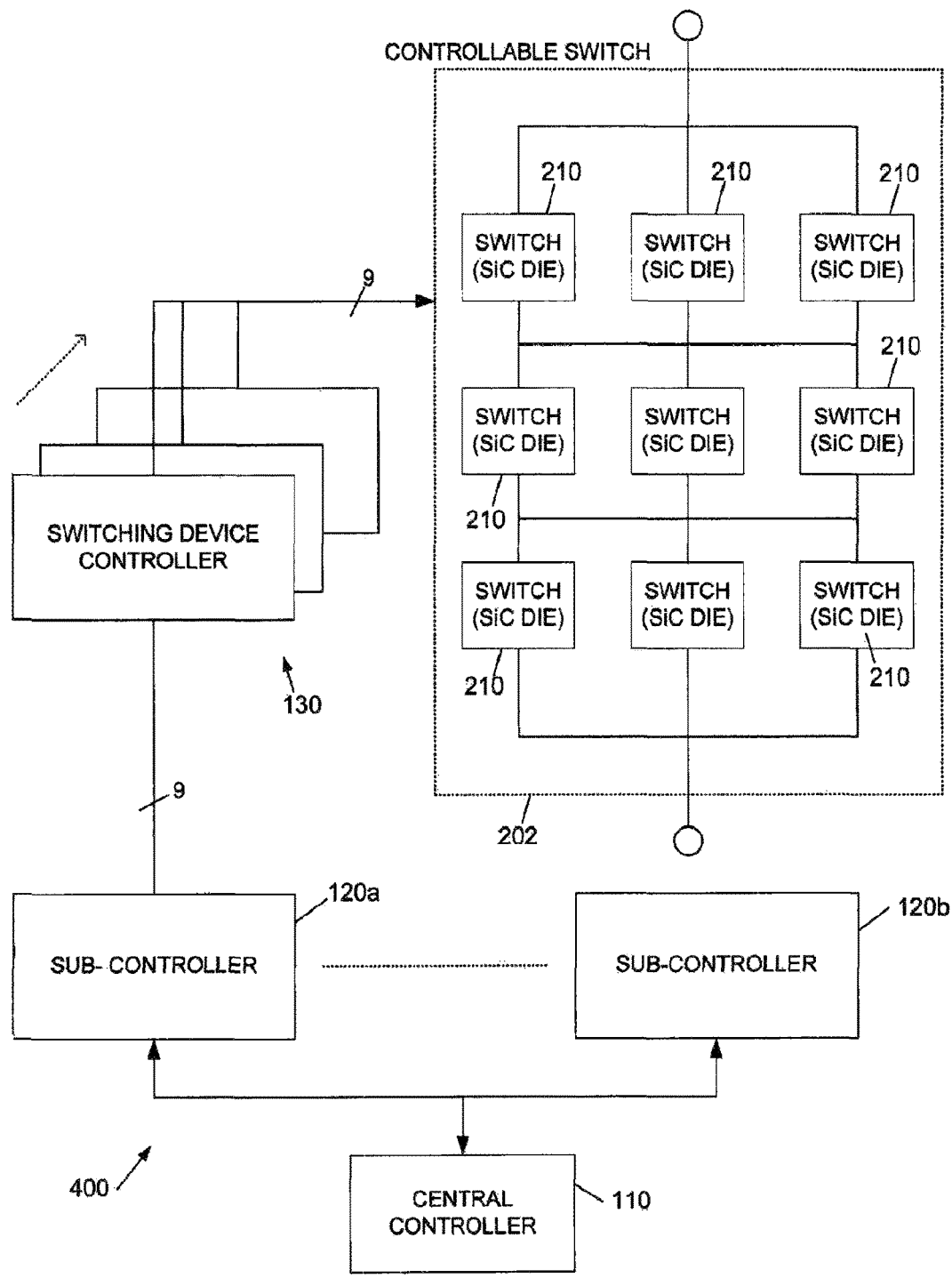
FIG. 10(a) shows control circuitry blocks within a power switching apparatus such as an inverter; such an apparatus may have one or more power switching devices in each phase leg half of one or more phase legs, and each device driver 2 may be coupled to a respective driver controller 1 and/or a plurality of device drivers 2 may be coupled to a driver controller 1 in common.

The power switching devices 5a, 5b of FIG. 10(a) are shown as IGBTs, however may additionally or alternatively comprise one or more FETs (e.g., MOSFETS or JFETs), LILETs, SCRs, etc. . . . . . Each such device 5a, 5b is shown as having an optional freewheel diode connected in parallel, for protection of the switching device against reverse voltages and currents.

Coupling between each device driver and its corresponding driver controller preferably provides voltage isolation for example by means of transformer- or opto-coupling. Thus, each preferably bi-directional link 3 of FIG. 10(a) may comprise optical fibre (e.g., an optical fibre for communication in both directions, or a respective such fibre for each direction) or a transformer. A communications method of an embodiment may be implemented for communication across such a link.

Figure 9B:
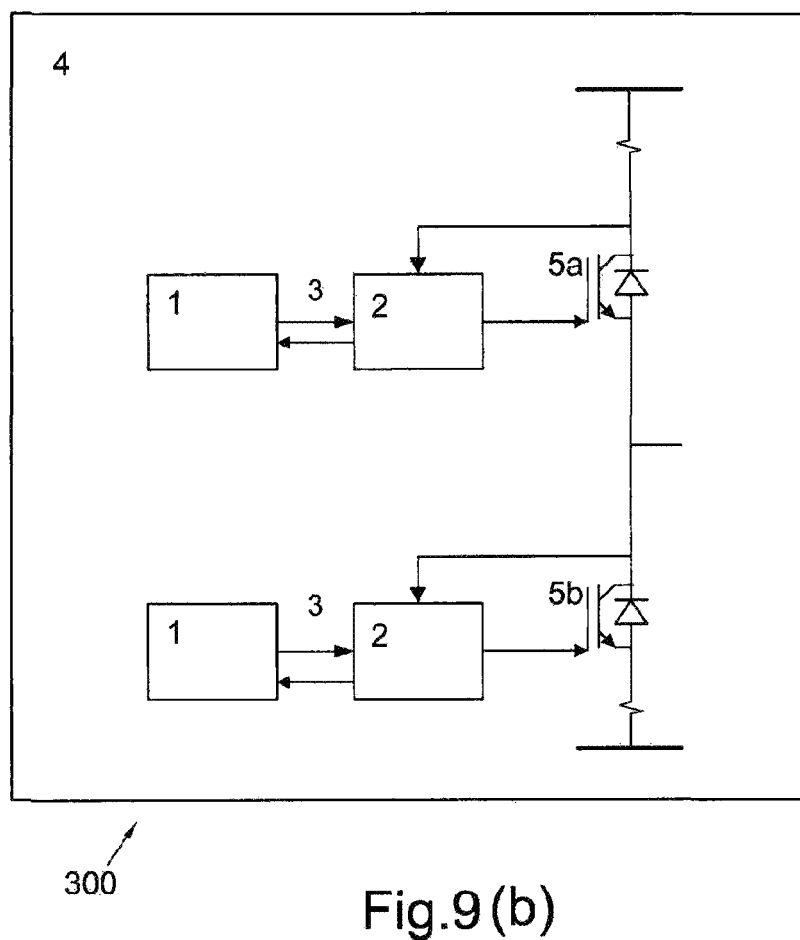

As the skilled person will recognise for example with regard to FIG. 9(b), circuitry not shown in FIG. 10(a) may be present, in particular one or more power switching devices may be present in either or both of the lines to the supply rails (e.g., VSS and OV) these lines are interrupted in FIG. 10(a) to indicate this.

A similar, but larger scale system has a single controllable switch that comprises nine power semiconductor switching devices, for example each comprising a silicon carbide die, multiple devices being connected in parallel to create a voltage level, sets of multiple devices then being connected in series to series-connect the voltage levels. In other arrangements a single switching device controller may control two or more switches or device dies. Each switch has a respective switching device controller which, in turn, is coupled to one of the sub-controllers. A separate bus runs between a sub-controller and a switching device controller so that there is one such bus for each switching device controller, but this is merely by way of example. In a high-voltage and/or current power electrical circuit with multiple switches hundreds or potentially thousands of semiconductor switching devices may be employed connected in series and/or parallel and the switching device controllers system control the switching of these devices no that they switch in synchronism, in effect substantially simultaneously. Use of an embodiment of the communications method may improve such synchronism.

Considering specifically the communications method, a preferred embodiment is advantageously for multiplexing two data streams over a single physical link such that one of the data streams arrives at the destination with a known latency. When more than one physical link is used this may mean that there is low skew between the two channels of known latency. Preferably, non-real time data is conveyed by differential pulse position modulation (DPPM). DPPM is advantageous because it is compatible with both optical and electrical interfaces, is tolerant of pulse distortion, requires no clock to be sent, and is widely used in industrial applications. The method may be optionally implemented in a network using 'Insight Communication Protocol' (ICP) as discussed below.

Advantageously, an embodiment may thus allow to send control information and data information over a single channel without adding too much timing uncertainty on the control signal.

For comparison, in less advantageous arrangements, if a channel is currently sending a data word by PPM/DPPM or any other packet based communication standard, waiting until the word has been sent before sending the control signal would introduce timing uncertainty equivalent to the transmission time of the word. Alternatively the current word could be aborted to allow the control signal to be sent, but this leads to data word errors which could invalidate large data packets. This would lead to an inefficient communication system where it would be difficult to distinguish between legitimate aborted words and channel errors. If the source of the control and data are the same, then it is possible to send the data during quiet times between control signals. However in a typical power converter, generation of the control signal is asynchronous to the data, and can come from a different source. In order to retrofit the solution into existing equipment it is generally assumed that the original equipment does not provide a signal suitable for identifying times when the channel is not in use.

An embodiment preferably makes use of the following features of the control signal:
- the timing of the control signal is conveyed by a transition from low to high or high to low;
- additional latency (typically less than 1 us) can be tolerated to achieve low skew between channels; and/or
- the bandwidth of the control signal is lower than the bandwidth of the data signal.

The embodiment advantageously implements a buffer (timing window) at each end of the communications channel. These buffers introduce a known timing delay which is consistent from channel to channel.

At the transmit end the control and data signals go into the buffer. If no transition is seen on the control signal, the data is sent. If a transition is seen, the data is delayed until the control signal is sent. After the control signal transition, there is delay before data transmission resumes.

At the receiver end, the incoming signal is decoded as standard DPPM. If a received pulse is greater than two standard pulse widths then it is decoded as the control signal. In this way the protocol allows for pulse width distortion.

An extension of the design involves sending a clock signal from the transmit end by a separate channel an that transmit and receive logic is time synchronised. Alternatively the clock signal can be recovered from the incoming data if a suitable phase-locked loop (PLL) is implemented. This reduces jitter on the control signal even further.

Such an embodiment solution is appropriate to optical and electrical channels. It may be independent of speed of connection, so can be used with low-bandwidth plastic optical fibre transceivers (bit rate of 1 Mbps) up to high speed differential electrical transceivers (bit rate of 100 Mbps or more). Preferably the channel is capable of transmitting a DC component, so interfaces that are AC-coupled only are less suitable, unless DC recovery is employed.

Embodiments may be implemented in gate drive products, for example for driving the gate of an IGBT, e.g., in a power converter. The principle may however be applicable to other sensor applications. For example any sensor that measures voltage, current, temperature or humidity in a power converter could make use of a similar system. If the sensor data needs to be delivered with known latency then the control signal would be the sensor measurement, and the data would be configuration and status information for the sensor. If there was no real-time requirement on the sensor data, it could be carried on the data channel and the control channel used to indicate faults. Furthermore, there may be other applications outside of the high voltage area where the number of physical channels has to be limited for reasons of cost or size.

Figure 1:
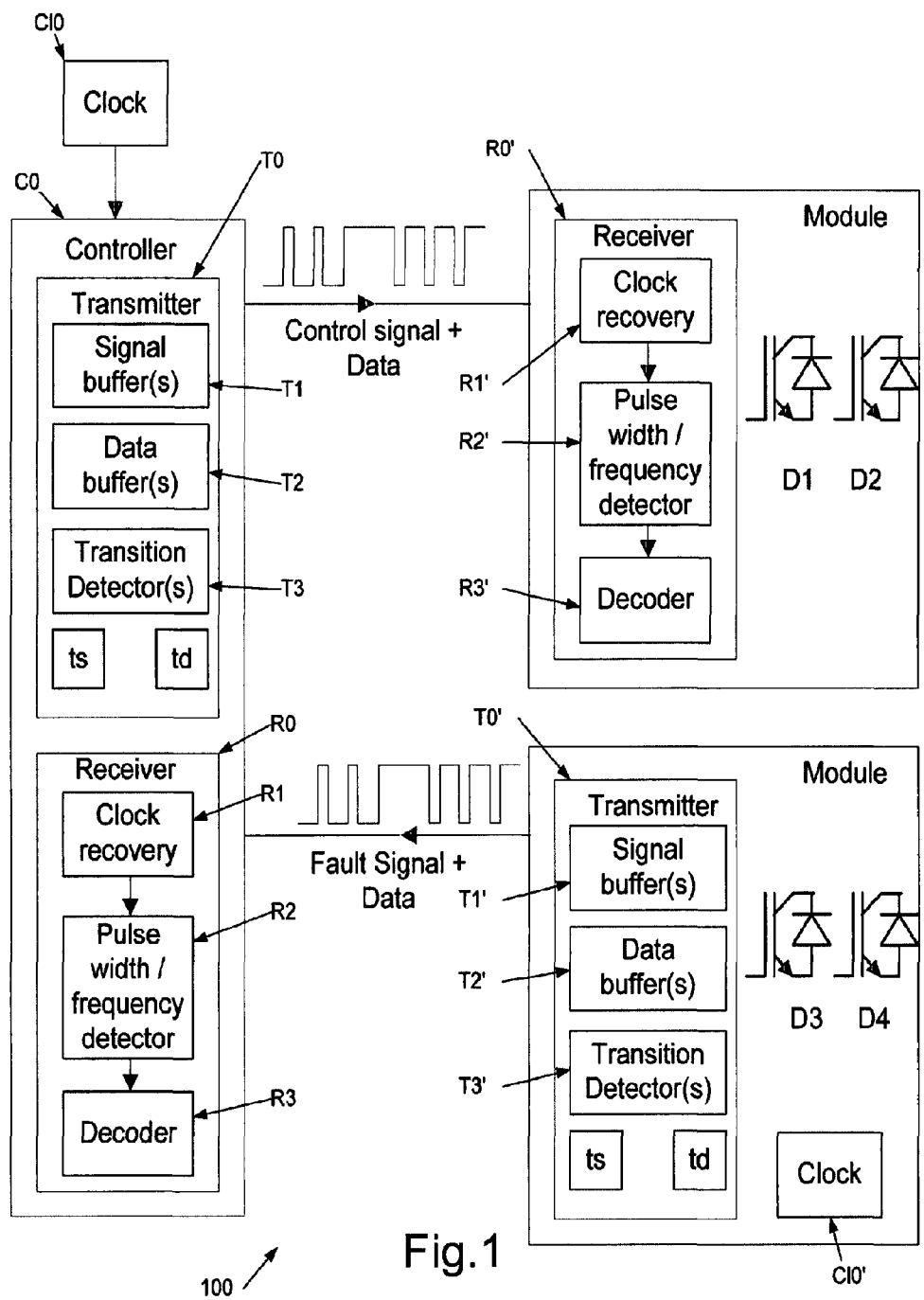
FIG. 1 shows a block diagram of a system embodiment.
Figure 2A:
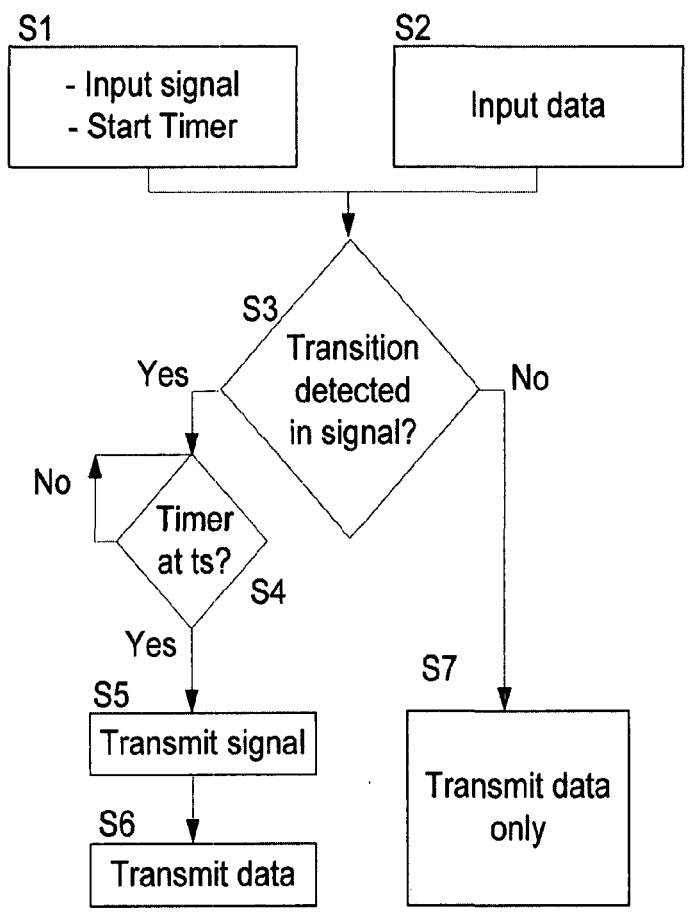
FIGS. 2(a) and 2(b) show flow diagrams of method embodiments, FIG. 2(b) relating for example to the block diagram of FIG. 2(c)

FIG. 1 shows system blocks of an embodiment comprising a controller coupled by communications links to respective modules. Each module comprises one or more power switching devices (D1-D4: note that switching units such as a gate drives for the devices are not shown). Each transmitter T0. T0' at a transmit end of a communications link, i.e. associated with a controller C0 or with a module, comprises signal and data buffers T1, T2 and a transition detector. Thus, both the signal and data to be output on the communications link may be stored while the signal is checked for whether it is a control or fault signal, i.e., whether it has a transition. The optional timing elements ts, td may be used to time the storage (delay) times of the signal and data, respectively; alternatively either delay may be determined by the structure of the corresponding buffer, e.g., length of a serial buffer. A clock may be provided within or externally to the controller or transmitter, to allow a clock signal to be embedded within a signal and data transmission on the communications link or to be transmitted in an additional channel on the communications link. A receiver R0, R0' may thus comprise a clock recovery unit R1, R1' to allow pulse width or frequency detection within the Receiver R0, R0' in order to decode the received transmission, e.g., to distinguish the signal and data of the transmission. The clock recovery may be achieved using a phase locked loop (PLL). A flow diagram of a method is shown in FIG. 2(a). In steps 1 and 2, which may occur simultaneously, a signal and data to be communicated on the link are received. The signal and/or data may be received on different inputs and/or generated locally to the transmitter (e.g. in the controller or module comprising the transmitter). The signal and data may be distinguished by, e.g., modulation scheme (based on frequency, amplitude or pulse width for example), and/or may be distinguished in the same way as in an LFON network; the signal and/or data may have been received from a LFON unit. The receipt of the signal may start a timer to time a delay (though the timing delay may be in effect be implemented by, e.g., a serial buffer as described above). In step 3 during the delay, the signal is checked to detect whether it has a transition and is thus to be treated a control/fault signal. Once the delay has elapsed, as determined by decision step 4, the signal is transmitted (S5). The data is transmitted only after the signal has been transmitted, and preferably after a predetermined delay, e.g., from the receipt of the signal in S1. Where no transition is detected in step S3, only the data may be sent.

Figure 11:
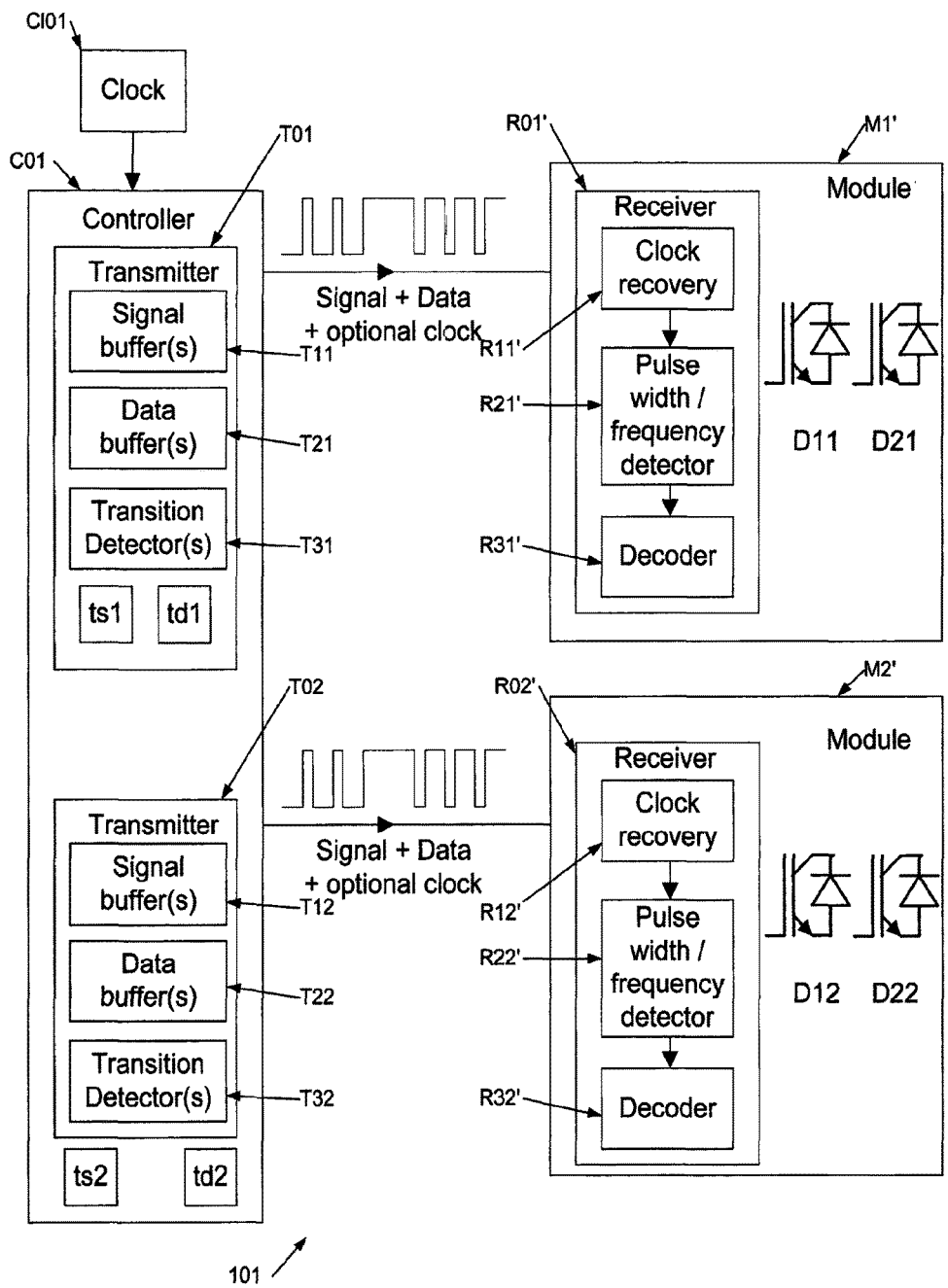
FIG. 11 shows a block diagram of a system embodiment.

FIG. 11 shows system blocks of a communications system embodiment 101 comprising at least one controller for coupling by communications link(s) to respective modules. The system may be provided with or without the communication link(s) and/or module(s). An embodiment may comprise: controller C01 (transmitter T01 and T02 may however be comprised in the same or separate controllers); a communications channel receive end having module M1' with power switching device(s) D11 and/or D21; a transmit end having transmitter T01 for transmitting a first signal (e.g., control or fault) and first data; a first communications link having a communications channel; a signal buffer for implementing a first predetermined time delay (Ts1) (there may also be provided a data buffer to allow for transmitting the data at a predetermined delay Td1 after the transmitting the first signal); a detector T31; a communications channel receive end having further module M2'; a further power switching device(s) D12 and/or D22; a transmit end for transmitting a further/second signal (e.g., control or fault) and further/second data; a further/second communications link having a (further) communications channel; a detector T32; end/ora signal buffer for second predetermined time delay (Ts2) (there may also be provided a data buffer to allow for transmitting the data at a predetermined delay Td2 after the transmitting the further/second signal).

Figure 2B:
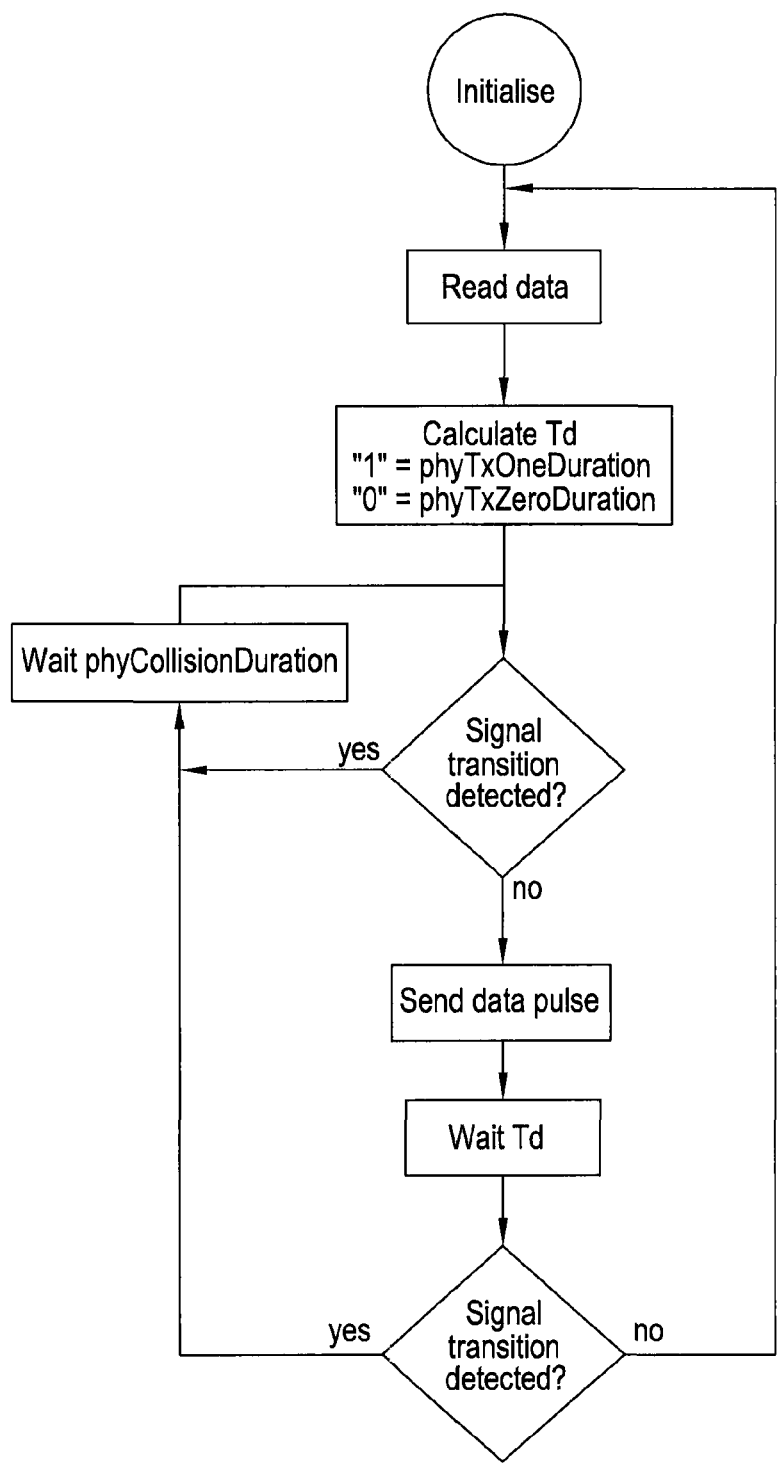
Figure 2C:
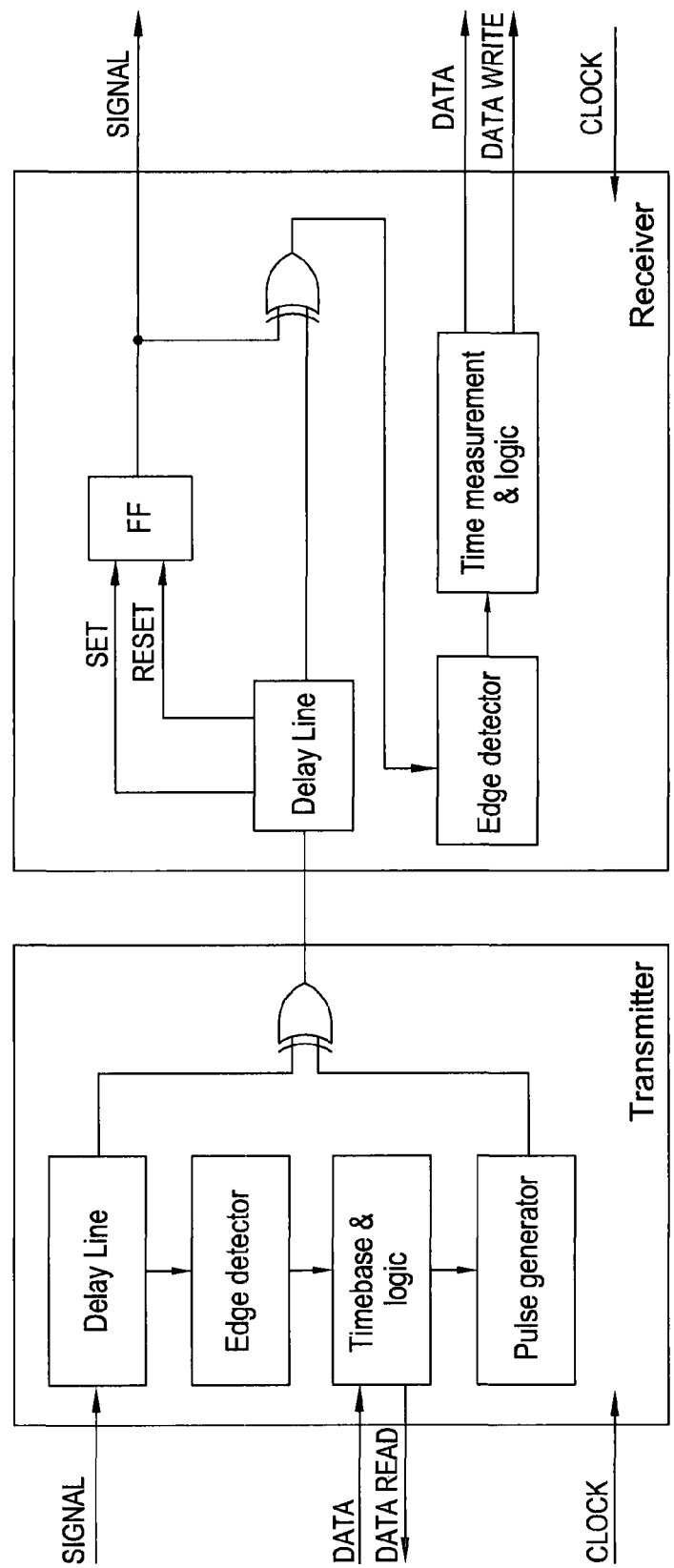

FIG. 2(*b*) is a more detailed flow diagram showing that the input of signal and data may be a continuous operation, and further showing the post signal delay and that the data may not be sent if there is another transition in the buffer.

Figure 3:
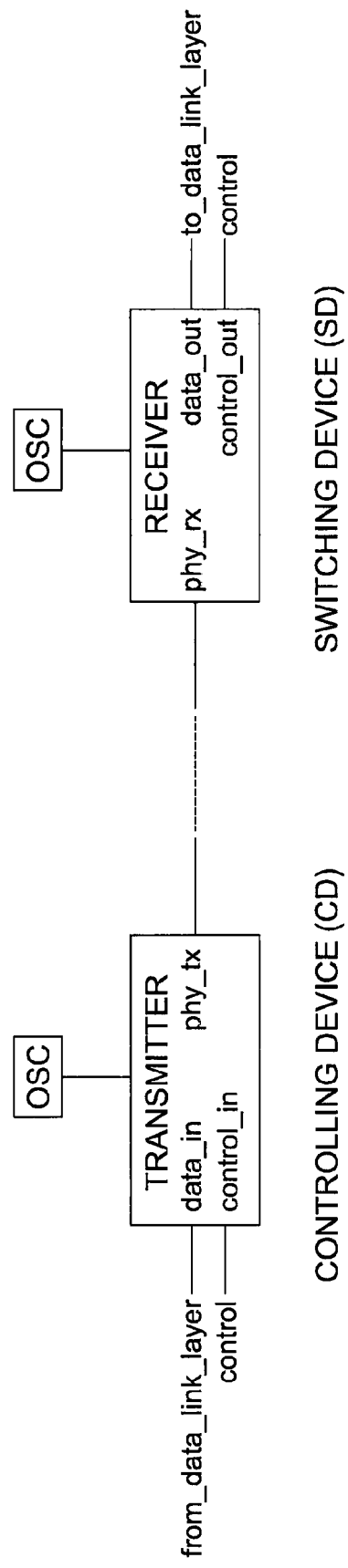
FIG. 3 shows a diagram showing a transmitter and a receiver coupled by a communications link for an embodiment.

A preferred system embodiment, such as that shown in FIG. 3, may comprise one or more switching devices, which are generally elements in a power-electronic system that control the on/off state of an individual power transistor or similar, or a small number of such devices. For example a gate-drive device for an IGBT. A controller or controlling device (CD) may determine the required state of all switching devices and communicate this state to them over the ICP. A control signal may from such a controller device (CD) to a switching device (SU) may indicate the required power-electronic state of the switching device (on or off). Furthermore, a fault signal may be a signal from a switching device (SU) to a controlling device (CD) to indicate that a fault has occurred. An LFON-based embodiment may use a single controller unit connected to a number of switching devices with plastic-optical fibre (POF) and with a simple protocol where the controller sends "light on" to turn the switching device on, and "light off" to turn the switching device off. The switching device may acknowledge each transition with a short (off) pulse on the return fibre, and indicates a fault with a long (off) signal.

An embodiment is implemented within a network using the Applicant's protocol referred to as 'Insight Communication Protocol' (ICP). ICP multiplexes a switching signal with a data channel enabling data communications between the devices. The ICP may be used to extend the reach of the Internet Protocol to power switching devices to enable these devices to join the "Internet of things". It is expected that "island networks" may be formed that consists entirely of power electronic devices (controllers, switching devices, etc.) but also that these islands will, in some cases, be connected to private and public internets to provide information over a wide area network.

More specifically, ICP may comprise at least the physical layer, the data link layer, the network layer and the application layer. Thus, the ICP of an embodiment may comprise:
  a set of physical layer protocols suitable for different environmental conditions and system requirements. These physical layer protocols provide a bidirectional data bit-stream between communicating devices in addition to any control/fault signal;
  a data link layer protocol that is independent of the physical layer. This enables the transfer of data frames between communicating devices. The data link layer definition includes hardware address (MAC address) definitions, frame checksums and so on;
  a network layer protocol that enables the transfer of packets between devices on different network segments; and
  an application layer protocol that enables both machine-to-machine and human-to-machine communication.

The physical layer and data link layer protocols may be used to form local-area-networks such as those between a single controlling device (CD) and a set of switching devices (SUs), this might be over distances from a meter or so to a few hundred meters. The network and application layers however make use of standard Internet protocols and might therefore be used over a wide area network with the ICP lower-level layers only being used for the "last link".

We describe below an implementation of the physical layer (interface) of such a communications system embodiment for a power converter. The physical layer is responsible for providing a bidirectional bit-stream between communicating devices. However, different physical layer implementations are envisaged depending on the requirements of the power switching system. For example, a system with very high voltage isolation requirements that is spread over a reasonable geographic area (for example a HVDC station) may require a fibre-optic communication system; a compact power-electronic subsystem in, for example, a passenger car, may be better served by an electrical protocol on copper. Different physical layers may provide significantly different capabilities such as differing bandwidth availability (possibly asymmetric) or different modes of operation.

An example implementation uses ICP-PHY-5F-5 Mbit/s Fibre Optic, wherein the ICP-PHY-5F physical layer is the Applicant's protocol using a pair of 5 Mbit per second fibres to provide a point-to-point data link superimposed on a control/fault signal. It is a bidirectional signalling mechanism based on combining two signals using the exclusive-or operation:
  the control/fault signal; and
  a pulse position modulated (PP data signal.

The receiver can distinguish the (relatively low-frequency) control/fault signals from (relatively high frequency) data pulses using a low-pass filter. The transmitter is responsible for ensuring that there is no collision between a pulse and a transition on the switching/fault signal. The time interval between pulses encodes one of three symbols: a binary '1', a binary '0', or a 'null'. The null symbol has a longer time interval than '1' or '0' and is inserted as required to avoid a collision.

ICP-PHY-5F has the following general characteristics;
  providing a point-to-point connection between a CD and a SU based on a Plastic Optical Fibre (POF) pair for distances of up to 20 m.
  a control/fault signal with an increased latency (compared to LFON) of less than 1 μs, and a jitter of less than 50 ns.
  a raw data rate of approximately 500 kbit/s independent of control/fault signalling frequency which is typically less than 100 kHz. As the control/fault signal approaches approximately 200 kHz the data rate drops off until no data transmission is possible.

The ICP-PHY-5F provides compatibility with the LFON insofar as a switching device with an ICP-PHY-5F interface will correctly interpret the LEON switching signal, and provides a fault signal that can be correctly interpreted by the controlling device. This enables ICP-PHY-5F devices to be inserted into a LEON.

Regarding Physical Layer Logical Interfaces, the ICP-PHY-5F physical layer has the following interfaces:
  a transmit output to the fibre-optic transmitter;
  a receive input from the fibre-optic transmitter;
  a data bit stream input from the data link layer;
  a data bit stream output to the data link layer;
  a control input: the switch signal for a CD, or the fault signal for a SU;
  a control output: the fault signal for a CD, or the switch signal for a SU.

FIG. 3 shows a diagram showing transmitter and receiver having such interfaces.

An example physical layer data coding scheme is based on Differential Pulse Position Modulation (DPPM). Symbols are encoded by modulating the time interval between adjacent pulses. The interval between adjacent pulses is specified by the time period between adjacent falling edges.

The transmitter generates a data pulse as an inversion in the output signal, the duration of the data pulse is given by the parameter phyTxPulseDuration (which is the nominal pulse width for the fiber transceiver). The receiver should accept an input data pulse if its timing is within the range given by phyRxPulseDuration. The receiver should update the control output only if the input is not changing for at least twice phyTxPulseDuration (low pass filter).

A binary '0' is encoded by transmitting adjacent pulses with an interval of phyTxZeroDuration; a one by transmitting adjacent pulses with an interval of phyTxOneDuration. The receiver should recognise a '0' if the interval is within the range given by phyRxZeroDuration, and a '1' if the interval is within the range given by phyRxOneDuration. An inter-pulse period outside these ranges is a "null symbol" and ignored by the receiver except to restart its pulse timing.

The transmitter may insert null symbols at any point in order to avoid a collision between a change in the switching/fault signal and the data pulse. The null symbol should be inserted if the transmitter detects that a data pulse would be within physCollisionDuration before or after a switching/fault signal edge. Advantages of the null symbols are:

- avoid transmitting a pulse on the fibre which is shorter than the minimum pulse width of the fibre transceiver; and/or
- allow enough time before and after the control signal edge without a data pulse so that the edge can be recovered by the low pass filter at the receiver.

The transmitter may generate a null symbol with an interval given by phyNullDuration. However, there is no maximum value for the null symbol duration, but an excessively large value may reduce the data throughput.

The transmitter detects potential clashes between the data pulse and the switching/fault signal by adding additional delay into the switching/fault signal and checking that there is no transition present during this delay window.

The following table gives example numeric values of parameters for the ICP-PHY-5F physical layer.

| Name | units | minimum | typical | maximum |
| --- | --- | --- | --- | --- |
| phyTxPulseDuration | ns | 180 | 200 | 220 |
| phyRxPulseDuration | ns | 100 | 200 | 300 |
| phyTxZeroDuration | ns | 980 | 1000 | 1020 |
| phyTxOneDuration | ns | 1980 | 2000 | 2020 |
| phyRxZeroDuration | ns | 800 | 1000 | 1600 |
| phyRxOneDuration | ns | 1800 | 2000 | 2600 |
| phyCollisionDuration | ns | 380 | 400 | 420 |
| phyNullDuration | ns | 4800 | 5000 | unlimited |

Figure 4:
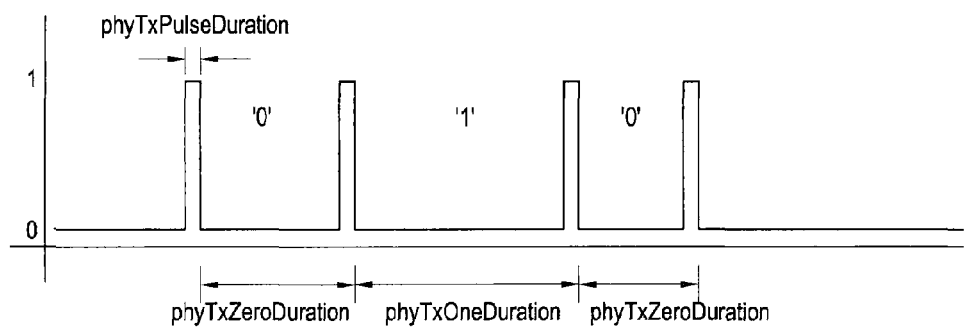
FIG. 4 shows an encoded data signal.

FIG. 4 shows example encoding of the binary sequence '0', '1', '0'. The interval between the pulses encodes the data values.

Figure 5:
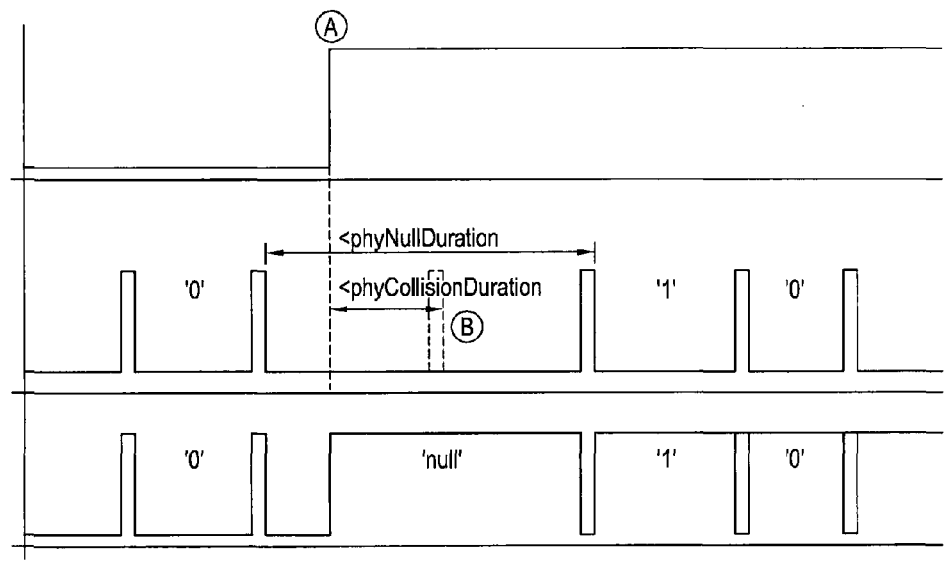
FIG. 5 shows encoded data with data/control signal collision.
Figure 6A:
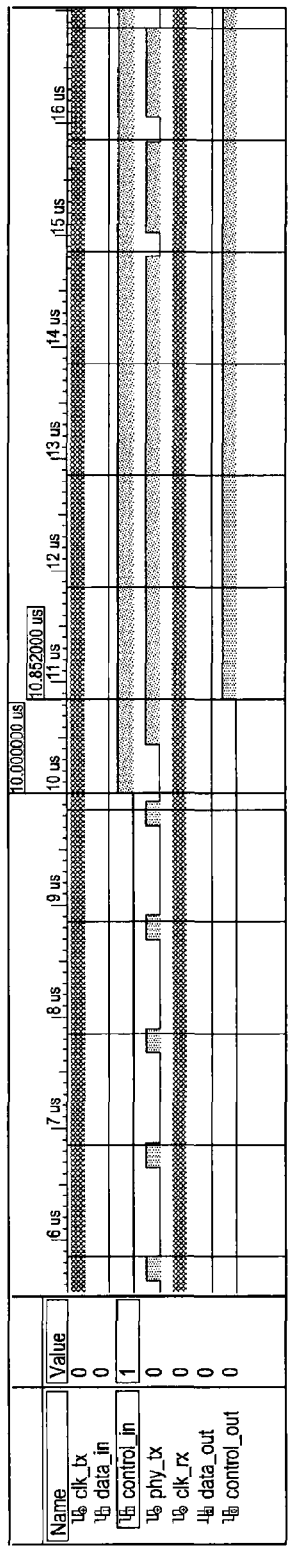
FIGS. 6(a) to 6(d) show data and control signals being transferred from the transmitter to the receiver. Specifically.
Figure 6B:
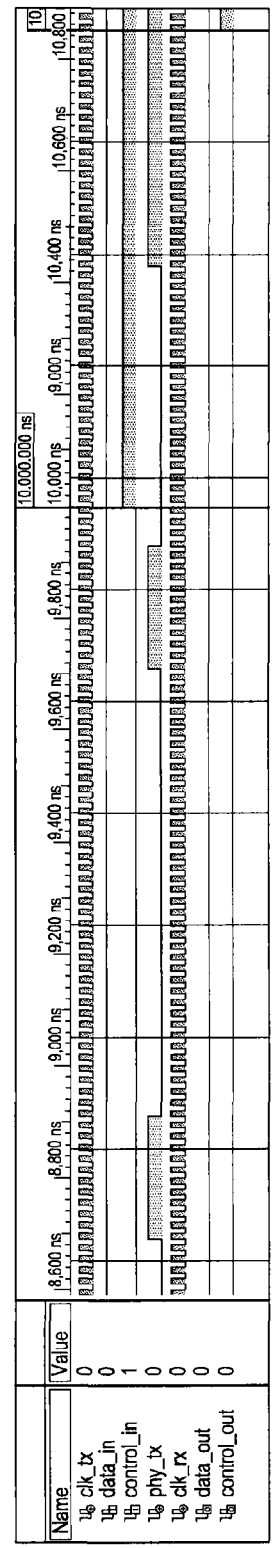
Figure 6C:
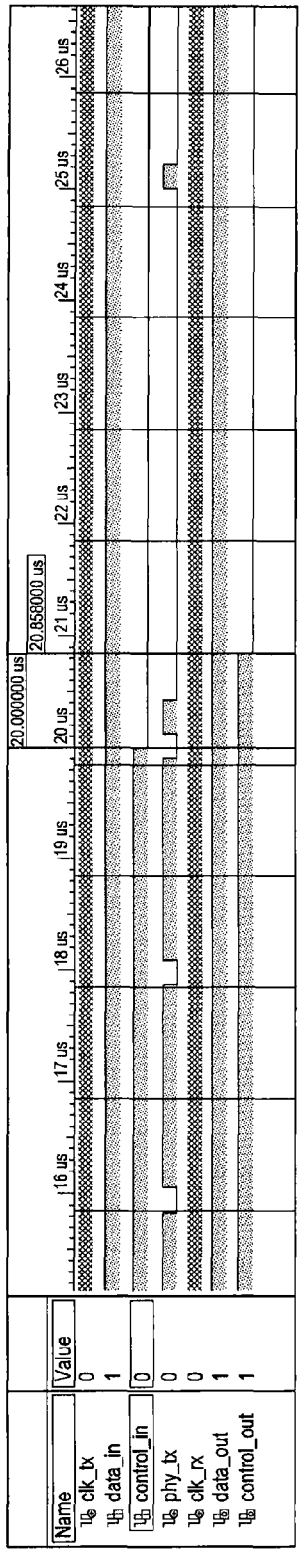
Figure 6D:
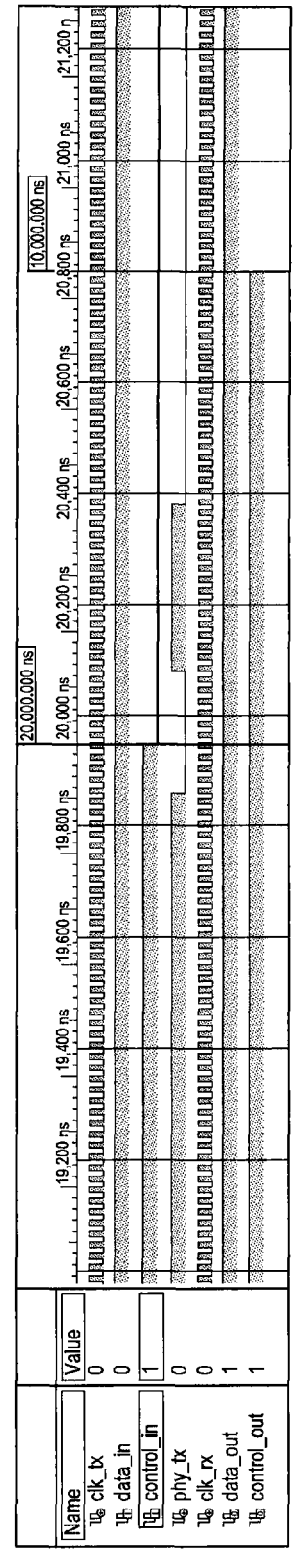

FIG. 5 shows the same data sequence as in FIG. 4 except that the pulse that would have occurred at time B (after a delay of phyTxOneDuration) would be within phyCollisionDuration of the transition on the control line. The three traces represent (from top to bottom), the control signal to be transmitted, the pulse encoded data signal, and the actual transmitted signal. The transmitter may insert a null symbol and the entire pulse train is delayed by phyNullDuration, in order to prevent a collision.

FIGS. 6(a) to (d) show data and control signals being transferred from the transmitter to the receiver. Note that each data pulse width comprises multiple system clock cycles, but the period of the clock is not very important. The minimum pulse width is set by the channel characteristics. The gaps between pulses can be altered. The ratio shown here has been chosen for implementation in standard programmable devices such as CPLDs and FPGAs. In the example the system clock is 50 MHz, i.e. 20 ns period. However the system can scale to any frequency, and could be implemented in a custom device such as an application specific integrated circuit (ASIC). In the waveforms the transmit and receive clocks are time synchronised, but this is not necessary. In the timing diagrams of FIGS. 6(a) to (d):

clk_tx is the transmit clock;

data_in is the data from the link layer to be sent, in these diagrams always 0 or always 1;

control_in is the control signal to be sent, shown transitioning from 0 to 1 or 1 to 0;

phy_tx is the output from the physical interface, i.e. the signal that goes across the interface;

clk_rx is the receive clock, which has the same frequency as clk_tx, but is not necessarily time synchronised;

data_out is the data to the link layer decoded by the receiver, in these diagrams always 0 or always 1:

control_out is the recovered control signal decoded by the receiver.

The waveforms shown so far explain how the control signal is transmitted from a CD to a SU with known latency. If the control input is synchronous to the transmit clock, then the only timing uncertainty introduced is the clock period of the receive clock, in this case 20 ns. If the control input is asynchronous to the transmit clock then there is a maximum of 20 ns additionally added at the transmitter. These uncertainties are due to the fact that the control signal may be sampled at any time by the clock which is asynchronous to it. The worst case is when the control signal edge is just after the sampling point. The new control signal value is sampled one clock cycle later. The worst timing uncertainty is then one clock cycle period.

Assuming the propagation delay of the signal is matched between the CD and multiple SUs (same length of optical fibre or wire), then the control signal will reach each SU with the same latency and known uncertainty (skew).

In some applications, for example parallel or series connected SUs, lower skew between devices may be preferable to ensure synchronised switching. In these cases an improvement can be made if the transmit and receive clocks are synchronised or locked together. The usual way to implement this is with a phase-locked loop (PLL) or delay locked loop. The PLL typically has a high frequency oscillator (OSC), and a phase comparator which compares the output clock with an input reference in a feedback control circuit. Such circuits are common in digital communication systems.

Figure 7:
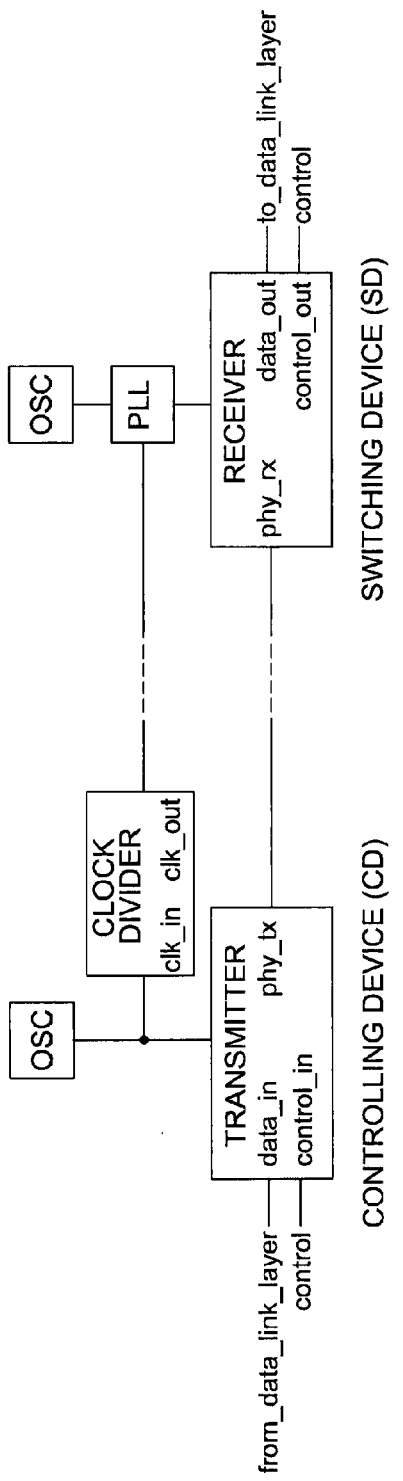
FIG. 7 shows the use of a phase-locked loop (PLL) to recover the transmit clock at the receiver in a system.

In FIG. 7 the receiver is locked to a divided version of the transmit clock. The clock divider is used to reduce the system clock to a frequency that is acceptable to the communication channel (e.g. LFON). The clock output from the PLL is at the same frequency as the transmitter clock and phase aligned. Transmitting a lower frequency clock across the communication channel has added benefits in terms of reduced electro-magnetic interference (EMI).

Figure 8:
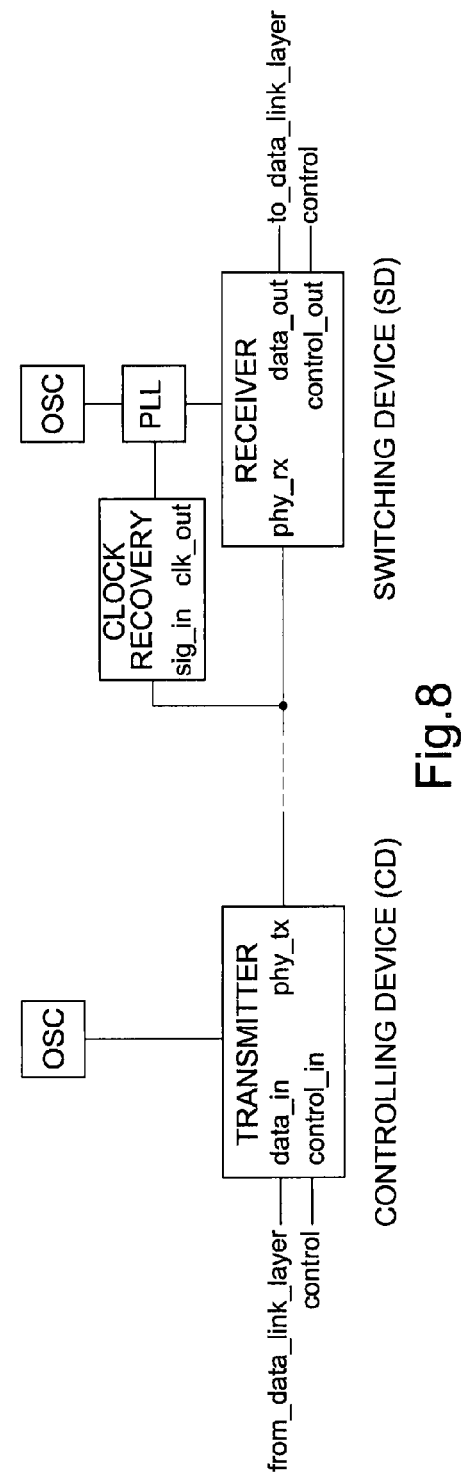
FIG. 8 shows a system using a phase-locked loop (PLL) to and clock recovery block to recover the transmit clock from the transmitted signal.

Unfortunately the system shown in FIG. 7 requires an additional communications channel in one direction (CD to SU) to carry the clock. An alternative is shown in FIG. 8 where the reference clock for the PLL is recovered from the transmitted signal. For this to be successful the transmitter preferably sends data continuously. If there is no valid data to send then the transmitter sends a null packet or flag character which the receiver discards. The flag character ensures that there are continual transitions seen on the channel even when the control input is static, and the system is designed so that there are sufficient transitions to recover a reference clock.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method for controlling a power-switching device of a power converter, the method comprising:
   inputting a first signal having a first bandwidth to a transmit end of a first link;
   inputting a second signal representing data and having a second bandwidth greater than the first bandwidth to the transmit end of the first link;
   determining whether the first signal comprises a transition;
   when the determination indicates that the first signal comprises a transition, transmitting the first signal comprising the transition into a channel of the first link, wherein the transmitted first signal is delayed by a predetermined time delay relative to the inputted first signal, the predetermined time delay to allow the determining;
   transmitting the second signal on the channel, wherein when the determination indicates that the first signal comprises a transition, transmitting the second signal being delayed until after transmitting the first signal: and
   if the first signal has been transmitted, receiving the transmitted first signal at a receive end of the first link and controlling the power-switching device dependent on the received first signal.

2. The method of claim 1, wherein the first link, the second signal and the predetermined time delay is a first predetermined time delay, the method further comprising conveying a third signal and a fourth signal representing second data via a second link, the conveying via the second link comprising:
   inputting the third signal to a transmit end of the second link;
   inputting the fourth signal to the transmit end of second link;
   determining whether the second signal comprises a transition;
   when the determination indicates that the third signal comprises a transition, transmitting the third signal into a channel of the second link, transmitting the third signal being delayed by a second predetermined time delay relative to the inputted third signal, the second predetermined time delay allowing the determining whether the second signal comprises a transition;
   transmitting the fourth signal on the second channel and, when the determination indicates that the third signal comprises a transition, transmitting the fourth signal being delayed until after transmitting the third signal; and
   if the third signal has been transmitted, receiving the transmitted third signal at the receive end of the channel, and controlling a further power-switching device dependent on the received third signal.

3. The method of claim 2, wherein the first and second predetermined time delays are for substantially synchronizing the controlling of the power-switching device dependent on the received first signal and the controlling of the further power-switching device dependent on the received third signal when the first and third signals are transmitted simultaneously, each controlling comprising switching the power-switching device.

4. The method of claim 2, wherein the first and second predetermined time delays are substantially equal, to thereby reduce skew between arrival of the first signal at the receive end of the first link and arrival of the third signal at the receive end of the second link.

5. The method of claim 1, wherein the second signal is sent on the channel using a modulation scheme, the method further comprising
   processing a pulse received at the receive end of the link as a pulse of a the first signal if the received pulse has a duration greater than a predetermined pulse width of the data modulation scheme.

6. The method of claim 1, wherein the delayed second signal is transmitted onto the channel at a predetermined delay after the transmitting the first signal on the channel.

7. The method of claim 1, further comprising the step of:
   inserting null symbols into the second signal to provide the delay of the transmitting of the second signal on the channel.

8. The method of claim 1, wherein the second signal is transmitted on the channel using pulse position modulation (PPM), preferably differential PPM (DPPM).

9. The method of claim 1, wherein the transmissions of the first signal and the second signal on the channel are to a module comprising the power-switching device and the first signal is a control signal, the controlling being dependent on the received first signal and switching of the power-switching device of the module.

10. The method of claim 1, wherein the transmissions of the first signal and the second signal on the channel are from a module comprising the power-switching device and the first signal is a fault signal, the controlling dependent on the received first signal controlling switching of the power-switching device of the power converter.

11. The method of claim 1, wherein the transmissions of the first signal and the second signal are from a module comprising the power-switching device, the first signal comprising a condition indication of the module, the method further comprising
   monitoring for the condition in substantially real time.

12. The method of claim 1, wherein the transmissions of the first signal and the second signal are to a module comprising the power-switching device, the second signal indicating a setting to be implemented in the module and/or at least one request for a condition indication of the module and/or at least one acknowledgment of a first signal received from the module.

13. The method of claim 1, wherein the transmissions of the first signal and the second signal are from a module comprising the power-switching device, the second signal indicating current module settings and/or at least one condition indication of the module and/or at least one acknowledgment of a first signal received at the module.

14. The method of claim 1, the method further comprising the steps of:

sending a clock signal on a further channel of a the link; and using the clock signal to synchronize logic circuit operation at the transmit end and the receive end of the link, the logic circuit operation for processing a the received first signal and/or received second signal.

15. The method of claim 1, the method further comprising the steps of:

recovering a clock signal from the first signal and/or the second signal received at the receive end; and synchronizing logic circuit operation at the transmit end and the receive end of the channel on the basis of the recovered clock signal, the logic circuit operation for processing the received first signal and/or the second signal.

16. A system for a power converter having at least one module comprising a power-switching device and further having a controller to control the module, the system comprising:

a transmitter configured to receive a first signal and the second signal, the transmitter for transmitting the received first signal having a first bandwidth and a second signal having a bandwidth greater than the first bandwidth over a channel for coupling the controller to the module, the transmitter comprising:

a first signal buffer configured to store the received first signal with the first bandwidth;

a data buffer configured to store the received second signal with the second bandwidth greater than the first bandwidth; and a detector configured to determine whether the stored first signal comprises a transition, the transmitter being configured to delay transmission of the stored first signal on the channel by a first predetermined time delay determined by the first signal buffer, the data buffer being configured to, when the detector indicates that the stored first signal comprises a transition, delay transmitting the stored second signal on the channel until after the transmission of the stored first signal on the channel.

17. The system of claim 16, wherein the first signal, the system configured to store and transmit a third signal and a fourth signal representing further on a further channel coupled to a further the module, the system further comprising:

a detector to determine whether the third signal comprises a transition, the system being configured to delay transmission of the stored signal on the further channel by a second predetermined time delay determined by a signal buffer for the storing the third signal, the second predetermined time delay for determining whether the third signal comprises a transition, the first and second predetermined time delays having values to reduce skew between arrival of the first and third signals at the receive ends of the respective channels.

18. The system of claim 17, wherein the first and second predetermined time delays have values to substantially synchronize the controlling of the power-switching device dependent on the received first signal and the controlling of the at least one further power-switching device dependent on the received further signal.

19. The system of claim 16, the system further comprising a receiver for receiving a the transmitted first signal and the second signal from the transmitter via a the channel, the transmitter being configured to transmit the second signal on the channel using a modulation scheme, the receiver comprising:

a detector configured to determine whether a received pulse has duration greater than a predetermined pulse width, the predetermined pulse width being a pulse width of the data modulation scheme; and a decoder configured to decode a pulse received at a receive end of the channel as a control signal pulse if an output of the detector indicates that the received pulse has duration greater than the predetermined pulse width.

20. A power converter comprising the system of claim 16, the converter having at least one module comprising the power-switching device and a drive circuit to control switching of the power-switching device, the converter having the controller to output the first signal for controlling the power-switching device, the converter comprising the link for the channel.

21. The system or power converter of claim 16, wherein the power-switching device comprises an IGBT.

* * * * *